(12) United States Patent
Mabayoje et al.

(10) Patent No.: US 7,900,058 B2
(45) Date of Patent: Mar. 1, 2011

(54) METHODS AND ARRANGEMENTS FOR REMOTE COMMUNICATIONS WITH A TRUSTED PLATFORM MODULE

(75) Inventors: Bukie O. Mabayoje, Hillsboro, OR (US); Vincent J. Zimmer, Federal Way, WA (US); Clifford DuBay, Lacey, WA (US)

(73) Assignee: Intel Corporation, Santa Clara, CA (US)

( * ) Notice: Subject to any disclaimer, the term of this patent is extended or adjusted under 35 U.S.C. 154(b) by 1217 days.

(21) Appl. No.: 11/513,993

(22) Filed: Aug. 31, 2006

(65) Prior Publication Data

US 2008/0060068 A1 Mar. 6, 2008

(51) Int. Cl.
| | |
|---|---|
| G06F 11/30 | (2006.01) |
| G06F 9/00 | (2006.01) |
| G06F 7/04 | (2006.01) |
| H04L 29/06 | (2006.01) |
| H04L 9/32 | (2006.01) |
| H04M 1/66 | (2006.01) |
| G06F 21/00 | (2006.01) |
| G06F 9/06 | (2006.01) |
| G06F 21/22 | (2006.01) |

(52) U.S. Cl. ............... 713/189; 713/1; 713/164; 713/176; 726/5; 726/9; 455/411

(58) Field of Classification Search ............... 713/189, 713/176, 164, 1; 726/9, 5; 455/411
See application file for complete search history.

(56) References Cited

U.S. PATENT DOCUMENTS

| | | | | |
|---|---|---|---|---|
| 7,474,888 | B1 * | 1/2009 | Davis et al. ............... | 455/411 |
| 7,676,666 | B2 * | 3/2010 | Lambert et al. ............ | 713/1 |
| 2005/0223221 | A1 * | 10/2005 | Proudler et al. ........... | 713/164 |
| 2006/0161972 | A1 * | 7/2006 | Cromer et al. ............. | 726/5 |
| 2008/0059799 | A1 * | 3/2008 | Scarlata .................... | 713/176 |

FOREIGN PATENT DOCUMENTS

WO WO 2009134270 A1 * 11/2009

OTHER PUBLICATIONS

Ming Ji, S. M. Shen, Wenjun Zeng, Taka Senoh, Takafumi Ueno, Terumasa Aoki, Yasuda Hiroshi, Takuyo Kogure, "MPEG-4 IPMP extension for interoperable protection of multimedia content", Jan. 2004, EURASIP Journal on Applied Signal Processing, vol. 2004, Publisher: Hindawi Publishing Corp., pp. 2201-2213.*

* cited by examiner

Primary Examiner — Matthew B Smithers
Assistant Examiner — Courtney D Fields
(74) Attorney, Agent, or Firm — Schubert Law Group PLLC; Neil K. Cohen

(57) ABSTRACT

Methods and arrangements to provide computer security are contemplated. Embodiments include transformations, code, state machines or other logic to provide computer security by receiving over a secure network connection a message to signal physical presence to a trusted platform module (TPM) and by signaling physical presence to the TPM in response to receiving the message. Some embodiments may involve sending the message over a secure network connection. In some embodiments, the receiving may be performed by a platform system management module. In many further embodiments, the signaling may include sending a signal over a secure general purpose input/output (GPIO) line or other hardware signaling mechanism. Other further embodiments may include sending a message pursuant to the intelligent platform management interface (IPMI) or other remote management protocol. In other embodiments, the receiving may be performed by a network stack of a basic input/output system. Other embodiments are described and claimed.

30 Claims, 6 Drawing Sheets

METHODS AND ARRANGEMENTS FOR REMOTE COMMUNICATIONS WITH A TRUSTED PLATFORM MODULE

FIELD

The present invention is in the field of the computer security. More particularly, the present invention relates to methods and arrangements for remote communications with a trusted platform module.

BACKGROUND

The security of computers and computer transactions is important. The use of computers is pervasive for both business and personal use. Data stored on computers may have high value. The data may include trade secrets and other confidential business data or personal information such as social security numbers and credit card numbers. The data may present tempting targets to errant hackers and professional criminals.

In addition, computers are increasingly used for electronic business transactions. Improved security is becoming mandatory and consumers and businesses alike are demanding a solution. To improve computer security, Intel helped to form the Trusted Computing Group (TCG), a not-for-profit industry-standards organization with the aim of enhancing the security of the computing environment in disparate computer platforms. The TCG has formed and adopted specifications for more secure computers.

TCG specifications define trusted computer platforms, computer platforms which may behave in a particular manner for a specific purpose. A trusted platform may provide data security functions such as data encryption and decryption and data storage. A key component of a trusted platform is the trusted platform module (TPM), a module which may perform cryptographic hashings to detect loss of integrity, public and secret key encryption to prevent unauthorized disclosure of data, and digital signing to authenticate transmitted information. The TCG Protected Storage mechanisms, which may be rooted in hardware, may be used to protect keys, secrets and hash values.

A trusted platform may also demonstrate that it operates in a safe configuration when it has access to confidential data by providing measurements of the configuration. TCG specifications provide for measuring the components of a computer platform, both hardware and software, and for storing the results of the measurements. The measurements of a configuration may be hashed and stored in Platform Configuration Registers (PCRs). A trusted platform may allow access to data only under a particular configuration of the trusted platform. The TPM seal operation may encrypt data, a set of PCR values, and an authorization or unique identifier. To unseal the data, and thereby gain access to it, the authorization must be presented and the set of values stored in the PCRs must match the set used in the seal operation. Similarly, a signing key may be sealed to a set of PCR values.

A TPM may transition from one execution mode or state to another. For example, a TPM may be disabled or deactivated (temporarily disabled). Similarly, a TPM may be enabled to accept an owner. As a safeguard, changing the state of a TPM may require a demonstration of physical presence. The demonstration of physical presence on a computer may constitute some operator action on a component of the computer such a depressing a push-button, typing a character from a keyboard, plugging in the AC power plug on some laptops, or switching a jumper.

The physical presence requirement may cause an economic burden in many computing facilities. The computers in these facilities may be administered remotely thousands of miles from the physical site of the computers. For example, these facilities may deploy enterprise servers, such as an IBM Bladecenter™-conformant rack or a pool of back-end servers in a data center. To assert physical presence may require a technician to visit each machine, shipping the machines to the administration site and shipping them back, or instructing an untrained local technician over the telephone how to assert physical presence. Further, even when a qualified technician is on-site, a manual assertion of physical presence may be time consuming. The technician may be required to access a particular blade server in a rack and wait until the blade server boots and reaches the correct operational state before manually interacting with the blade server.

BRIEF DESCRIPTION OF THE DRAWINGS

Aspects of the invention will become apparent upon reading the following detailed description and upon reference to the accompanying drawings in which like references may indicate similar elements.

DETAILED DESCRIPTION OF EMBODIMENTS

The following is a detailed description of embodiments of the invention depicted in the accompanying drawings. The embodiments are in such detail as to clearly communicate the invention. However, the amount of detail offered is not intended to limit the anticipated variations of embodiments; but on the contrary, the intention is to cover all modifications, equivalents, and alternatives falling within the spirit and scope of the present invention as defined by the appended claims. The detailed descriptions below are designed to make such embodiments obvious to a person of ordinary skill in the art.

Generally speaking, methods and arrangements to provide computer security are contemplated. Embodiments include transformations, code, state machines or other logic to provide computer security by receiving over a secure network connection a message which directs a signaling of physical presence to a trusted platform module (TPM). The embodiments may also include signaling physical presence to the TPM in response to receiving the message. Some embodiments may involve sending over a secure network connection a message which directs signaling physical presence to a TPM. In some embodiments, the receiving may be performed by a baseboard management controller, a service processor, or other platform system management module. In many further embodiments, the signaling may include sending a signal over a secure general purpose input/output (GPIO) line or other hardware signaling mechanism. In other further embodiments, the signaling may include sending a message pursuant to the intelligent platform management interface (IPMI), Web Services Management, or other protocol for remote management. In other embodiments, the receiving may be performed by a network stack of a basic input/output system (BIOS).

While specific embodiments will be described below with reference to particular circuit or logic configurations, those of skill in the art will realize that embodiments of the present invention may advantageously be implemented with other substantially equivalent configurations.

Figure 1:
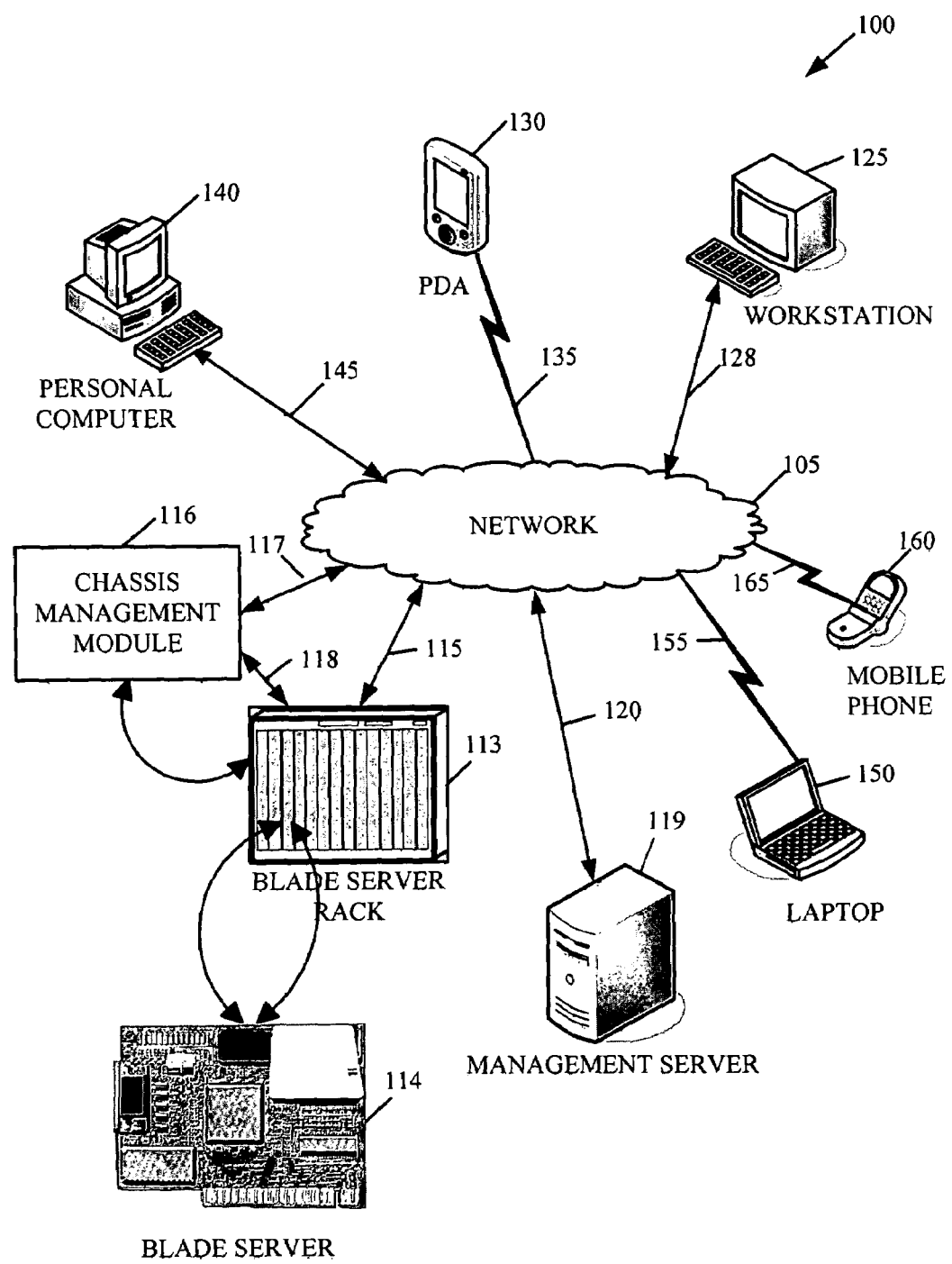
FIG. 1 depicts a network diagram of an embodiment of a system to indicate physical presence to a Trusted Platform Module (TPM) in response to receiving a message over a secure network connection.

FIG. 1 depicts a diagram of an embodiment of a networked system 100 of devices capable of indicating physical presence to a trusted platform module (TPM) in response to receiving a message over a secure network connection. The system 100 includes network 105, blade server rack 113 connected to network 105 through wireline connection 115, management server 119 connected to network 105 through wireline connection 120, and a variety of devices (TPM devices) capable of receiving a message over a secure network connection directing the signaling of physical presence to a TPM and signaling physical presence to the TPM in response receiving the message. The TPM devices include:

- workstation 125, a computer coupled to network 105 through wireline connection 128,
- personal digital assistant (PDA) 130, coupled to network 105 through wireless connection 135,
- personal computer 140, coupled to network 105 through wireline connection 145,
- laptop computer 150, coupled to network 105 through wireless connection 155; and
- mobile phone 160, coupled to network 105 through wireless connection 165.

Network 105, which may consist of the Internet or another wide area network, a local area network, a management network, or a combination of networks, may provide data communications among the blade server rack 113, the management server 119, and the TPM devices 125, 130, 140, 150, and 160. Blade server rack 113 may consist of a chassis with a group of blade servers or stripped down computers such as blade server 114. Blade server 114 may, for example, consist of an Intel® Server Compute Blade SBXD62. The chassis may contain input/output devices and network connections for the blade servers.

The chassis of blade server rack 113 may also contain chassis management module (CMM) 116, a device such as Intel® NetStructure™ MPCMM0001 or MPCMM0002 which oversees the operation of the blade server rack 113. CMM 116 may be connected to network 105 through wireline connection 117 and connected to other components of the blade server rack through wireline connection 118. Wireline connection 118 may, for example, consist of an RS-485 connection to a blade server such as blade server 114.

CMM 116 may monitor such system variables of blade server rack 113 as temperature and power use, and such system modules as drives, blowers, and switches. CMM 116 may receive from platform system management modules such as a service processors or baseboard management controllers (BMCs) within each blade server of blade server rack 113 information about system performance such as power usage, temperature, notice of hardware failure, and voltage. CMM 116 may also communicate with the BMCs to control system usage, such as power on or off requests, error and event reporting, and keyboard, video, and monitor requests. For example, CMM 116 may communicate with a BMC to arrange to remotely mount drives for access by blade servers. CMM may collect management information from the BMCs on a server rack, integrate and secure the information, and transmit the information to management server 119. Similarly, CMM 116 may receive messages from management server 119 such as requests for information or instructions for changing system status and may relay them to the BMCs, service processors, or other platform system management modules on a server rack. CMM 116 may also provide for updating firmware on various components in the system.

Management server 119 may contain and run programs to remotely manage servers such as blade server 114 contained in blade server rack 113. The programs may monitor the functioning of the blade servers and may enable maintenance of the blade servers. The programs may send messages to CMM 116 and CMM 116 may in response transmit messages to the platform system management modules such as service processors or BMCs of the individual blade servers such as blade server 114. Management server 119 may send a message to CMM 116 to signal physical presence to a TPM contained in a blade server such as blade server 114 in blade server rack 113. CMM 116 may relay the command to a platform system management module such as a BMC or service processor contained in a blade server such as blade server 113. In response, the platform system management module such as a BMC or service processor may signal physical presence to the TPM.

TPM devices 125, 130, 140, 150 and 160 may contain TPMs and may receive messages over network 105 to signal physical presence to the TPMs. Components of TPM devices 125, 130, 140, 150 and 160 may signal physical presence to the TPMs in response to receiving the messages.

The arrangement of the devices making up the exemplary system illustrated in FIG. 1 is for explanation, not for limitation. Data processing systems useful according to various embodiments of the present invention may omit a management server or a blade server rack or may include additional servers, routers, other devices, and peer-to-peer architectures, not shown in FIG. 1, as will occur to those of skill in the art. Various embodiments of the present invention may be implemented on a variety of hardware platforms in addition to those illustrated in FIG. 1. Blade server racks may be implemented without platform system management modules, service processors, BMCs, or chassis management modules. Networks in such data processing systems may support many data communications protocols, including for example TCP (Transmission Control Protocol), HTTP (HyperText Transfer Protocol), WAP (Wireless Access Protocol), HDTP (Handheld Device Transport Protocol), and others as will occur to those of skill in the art. In embodiments of the invention, network devices such as a chassis management module may be connected to the network by wireline connections, by wireless connections, or by both.

Figure 2:
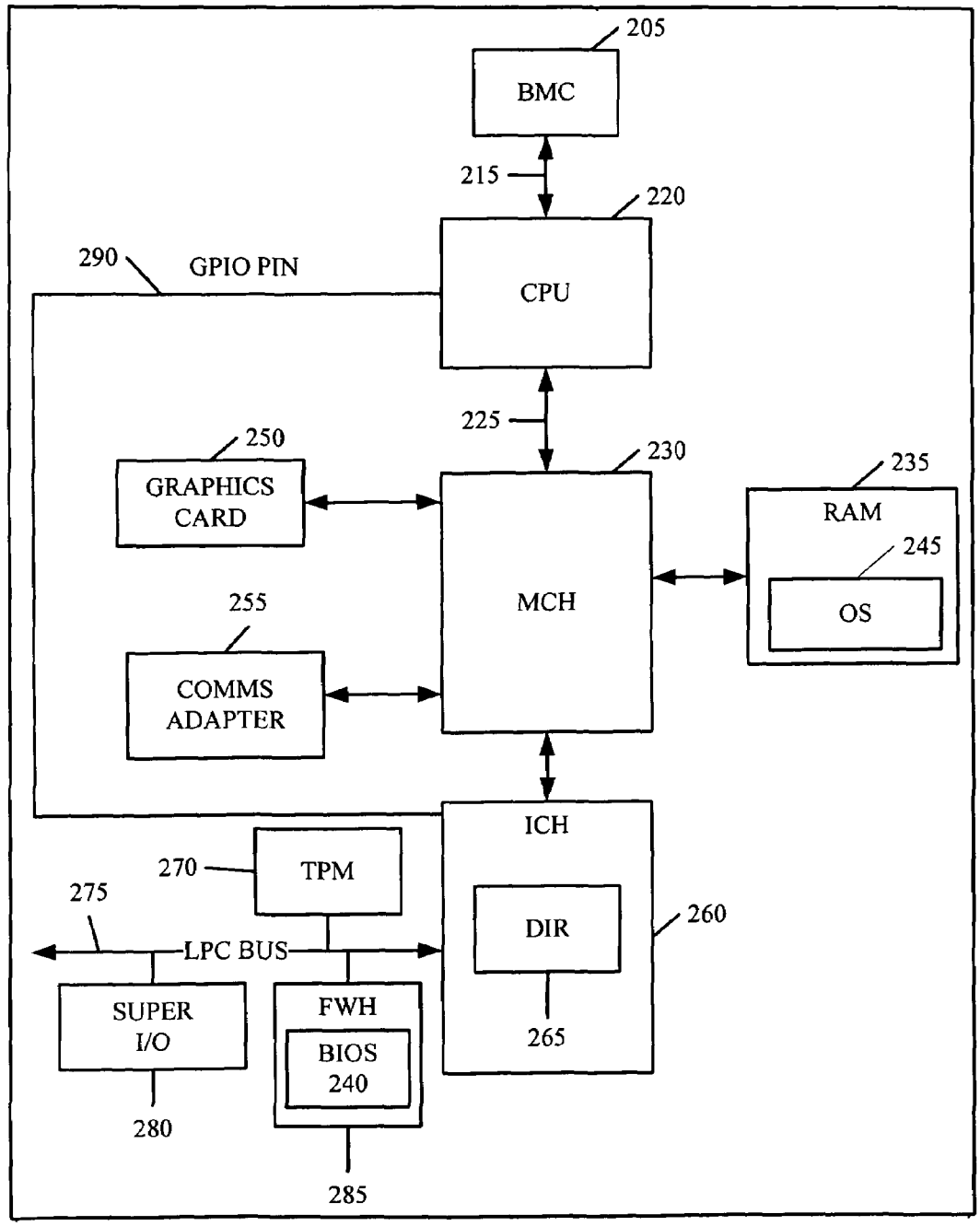
FIG. 2 depicts an embodiment of a computer to indicate physical presence to a TPM contained in the computer in response to receiving a message.

Turning now to FIG. 2, there is shown an embodiment of a computer 200 capable of receiving a message over a secure network connection directing an assertion/de-assertion of physical presence to a TPM and of signaling physical presence to the TPM in response to receiving the message. Computer 200 may comprise a blade server such as blade server 114 contained in a blade server rack 113 shown in FIG. 1. Computer 200 includes a baseboard management controller (BMC) 205, a processor 220 or CPU, northbridge or graphics and memory controller hub (MCH) chip 230, random access memory (RAM) 235, graphics card 250, communications adapter 255, southbridge or I/O controller hub chip (ICH) 260, TPM 270, super I/O chip 280, and firmware hub (FWH) 285. BMC 205 and CPU 220 are connected by bus 215, which may be a serial bus. CPU 220, MCH 230, RAM 235, graphics card 250, communications adapter 255, and ICH 260 may be connected by system bus 225. ICH 260 may be connected to TPM 270, super I/O 280 and FWH 285 by low-pin count (LPC) bus 275. CPU is connected to ICH 260 by GPIO pin 290.

BMC 205 may comprise a microcontroller which monitors on-board instrumentation (temperature sensors, CPU status, fan speed, voltages), provides remote reset or power-cycle capabilities, sends alarms when a failure occurs, and enables remote access to BIOS configuration or operating system console information. BMC 205 may serve as the interface between platform hardware and management software. BMC may be capable of operating separately from the CPU 220 and OS 245. BMC 205 may communicate with a chassis management monitor, reporting conditions and receiving commands.

CPU 220 may consist, for example, of a pair of dual-core Intel® Xeon® processors. MCH 230 may handle communications between CPU 220, RAM 235, graphics card 250 and communications adapter 255. MCH 230 may also serve as an intermediary between ICH 260 and CPU 220. Stored in RAM 235 is an operating system 245. Operating system 245 may comprise UNIX®, Linux®, Microsoft Windows®, Mac OS X® or other operating systems.

Graphics card 250 may process graphics and display the graphics on a monitor. Communications adapter 255 may implement the hardware level of data communications through which one computer sends data communications to other computers directly or through a network. Such data communications may be carried out through serially through RS-232 connections, through external buses such as USB, through data communications networks such as IP networks, through RS-485 connections, and in other ways as will occur to those of skill in the art. Examples of communications adapters include modems for wired dial-up communications, Ethernet (IEEE 802.3) adapters for wired network communications, and 802.11b adapters for wireless network communications. Computer 200 may signal physical presence to TPM 270 in response to receiving a message through communications adapter 255 from a secure network connection.

ICH 260 may control the operation of the LPC bus 275. In some embodiments, ICH 260 may also control the PCI bus, the real-time clock, the USB bus, power management, and the interface with other peripheral devices. ICH 260 contains data integrity registers (DIR) 265 which provide non-volatile storage.

FWH 285 may contain BIOS 240, which may include both system BIOS and integrated graphics/video BIOS. FWH 285 may also provide security functions. System BIOS is firmware that may control the basic hardware operations of a computer, including interaction with disk drives and IO devices. System BIOS is generally stored in non-volatile memory and loaded upon system start-up. Execution of the start-up instructions in system BIOS may perform a series of system checks. System BIOS may check for an assertion of physical presence upon the starting up or rebooting of computer 200. Super I/O chip 280 may provide serial port control, parallel port control, floppy disk drive control, real-time clock control, and mouse and keyboard control.

TPM 270 may provide security functions including protected storage, measurement and attestation of the software configuration of computer 200, and cryptographic functioning. TPM 270 may permit access to data in protected storage by programs only upon authorization to make the data available. TPM 270 may perform cryptographic key generation, encryption, and decryption. In some embodiments, TPM 270 may be implemented in hardware. In further embodiments, TPM 270 may consist of a module similar to a smart card. In other embodiments, TPM 270 may be implemented in software. Such an implementation is called a virtual TPM. In such an implementation, a software mechanism may be used to assert/de-assert physical presence.

The computer and components illustrated in FIG. 2 are for explanation, not for limitation. In some other embodiments, embedded systems, PDAs, cell phones, and other TPM devices which contain a TPM may signal physical presence to the TPM in response to receiving a message over a trusted network connection. In many other embodiments, the chipset may contain alternative components or additional components as will be known to those of skill in the art. In some further embodiments, the TPM may be integrated into another device (an "integrated TPM"). For example, the TPM and BIOS may be integrated into a super I/O chip and the LPC bus may be omitted. In other further embodiments, the TPM may be integrated into an MCH chip, an ICH chip, a network interface card, or other components of a computer. In these many other embodiments, the appropriate bus may be used to assert/de-assert physical presence. In several other embodiments, the components communicating with the chipset may differ from the components illustrated in FIG. 2.

One example of an alternative embodiment consists of a computer built according to the Intel® Active Management Technology (Intel® AMT). Intel® AMT is a combination of hardware, firmware and software that may provide for out of band communication for management access to client systems, independent of system state. AMT-enabled computers may include an integrated TPM and a platform system management module other than a BMC. In addition, an AMT-enabled computer may use a hardware mechanism other than a GPIO line to send signals from the platform system management module to the TPM.

Figure 3:
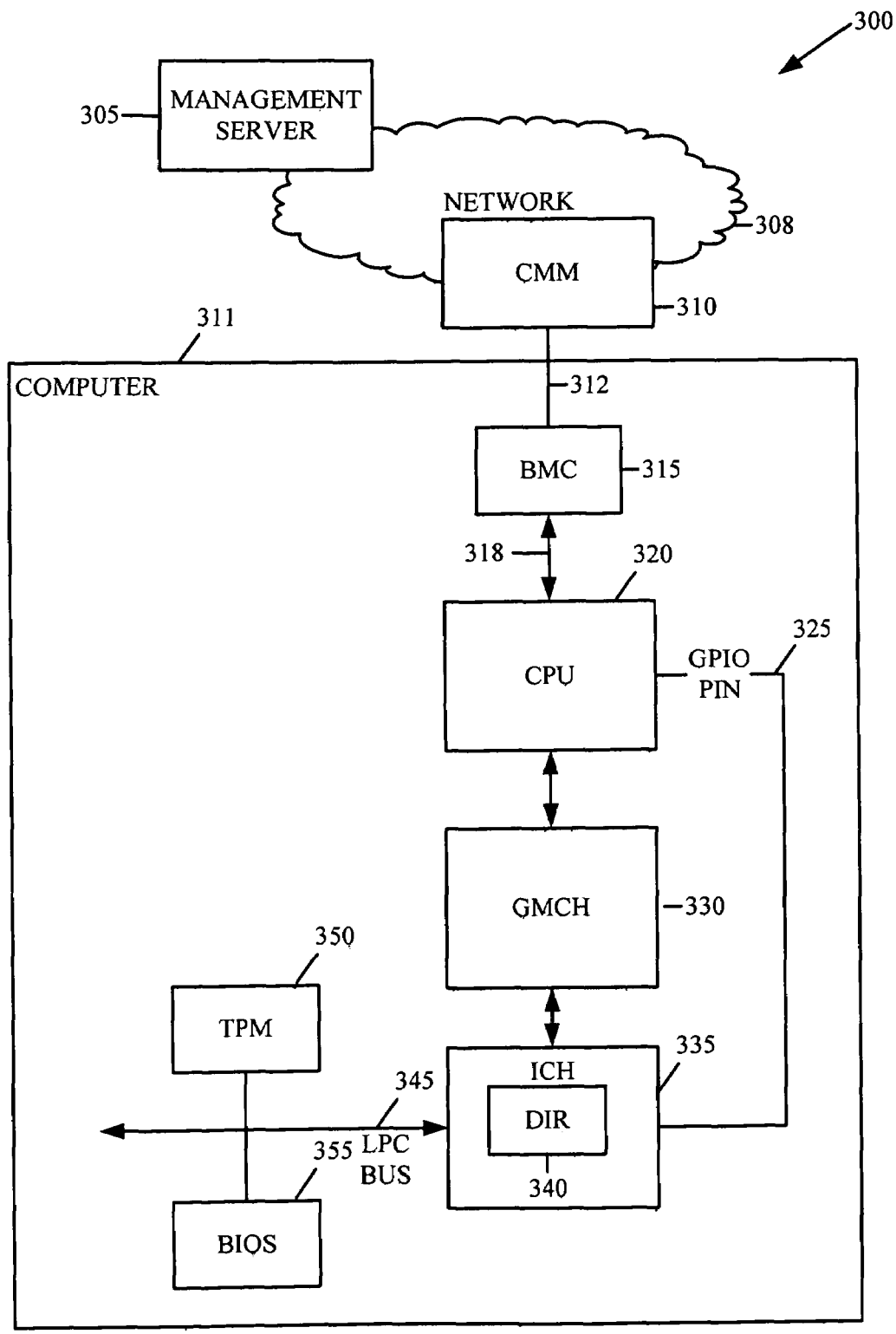
FIG. 3 depicts a diagram of an example flow of communications from a management server to a TPM.

Turning to FIG. 3, depicted is a diagram 300 of an example flow of communications from a management server to a TPM. Messages may be transmitted from management server 305 through network 308 to chassis management module (CMM) 310 and from CMM 310 through wireline connection 312 to computer 311 and eventually to TPM 350. In the embodiment of FIG. 3, management server 305 may send a message to assert/de-assert physical presence. A technician in a corporate information technology department at management server 305 may, for example, desire to establish ownership of computer 311 or otherwise initiate a change of state of TPM 350 that requires a showing of physical presence.

The message may be sent over a variety of protocols for the remote management of servers and other computers, such as the Intelligent Platform Management Interface (IPMI), Web Services Management (WS-MAN), the Simple Network Management Protocol, Hewlett-Packard's Integrated Lights-Out, Dell's Remote Assistant Card, or Sun's Advanced Lights Out Management. IPMI is described in Intelligent Platform Management Interface Specification Second Generation v2.0 (Feb. 15, 2006) by Intel, Hewlett-Packard, NEC and Dell. WS-MAN is a SOAP-based protocol described in Web Services for Management (WS-Management June 2005). The co-developers of the specification include Intel. These and other protocols may utilize the Intel Active Management Technology, which provides built-in platform capabilities for the remote management of networked computing assets.

Security may be provided for the transmission of messages from management server 305 to CMM 310. The security protocol followed may depend upon the interface used to send the messages. In some embodiments, messages sent through a web-based interface may follow the Transport Layer Security (TLS) or Secure Sockets Layer (SSL) protocol. These protocols may provide for authentication of the parties to the communications, encryption of the messages, and a check on the integrity of messages through use of a message authentication code. Messages sent through a command line interface or through telnet may follow the secure shell protocol (SSH), which provides similar features. In other embodiments, the IP security protocol (IPSec) may be used for encryption and integrity.

In several embodiments, authentication and authorization may be provided by the Lightweight Directory Access Protocol (LDAP), Remote Authentication Dial-In User Service (RADIUS), Terminal Access Controller Access Control System Plus (TACACS+), Network Information Service (NIS), or Kerberos. An LDAP server may maintain a list of registered users and authorizations, and may check that a user does not act beyond the user's authorization.

The IP configuration of CMM 310 may provide additional security. In some embodiments, CMM 310 may be located on a private network, a network with nodes that cannot be accessed directly from the Internet. In many embodiments, CMM 310 may be located within a management network such as a virtual local area network separate from the network on which the computers managed by CMM 310 are located. In many embodiments, access to the CMM 310 may require a login and password. In further embodiments, the logins may be recorded in a chassis event log.

CMM 310 may send a message to computer 311 to indicate physical presence to TPM 350. Computer 311 may also include BMC 315, CPU 320, GMCH chip 330, ICH chip 335, and BIOS 355. BMC 315, CPU 320, GMCH 330 and ICH 335 may be connected by system bus 318. ICH 335 may be connected to BIOS 355 and TPM 350 by LPC bus 345. The message sent by CMM 310 may be received by BMC 315 over connection 312. In many embodiments, CMM 310 may connect to BMC 315 through a proprietary bus such as an RS-485 bus. In further embodiments, the CMM 310 may assert a physical signal line to establish a connection with computer 311. For example, computer 311 may consist of a blade server in a blade rack. The blade chassis may include a LAN. The CMM 310 may enable a physical signal line to connect a given LAN port to a specific blade such as computer 311. The connection from CMM 310 to BMC 315 may consist of a single channel. The connection may require a log-in and password, and may require BMC 315 to authenticate CMM 310. The connection from CMM 310 to BMC 315 may be out-of-band; that is, it may occur without reliance on an operating system. For example, BMC 315 may be powered independently of CPU 320 and may be able to operate independently of CPU 320 and the operating system that runs CPU 320. Accordingly, BMC 315 may be able to receive a message from CMM 310 and respond to it without utilization of CPU 320 or the operating system of computer 311.

When BMC 315 receives a message to signal physical presence to TPM, the BMC 315 firmware may, in turn assert general purpose input/output (GPIO) line 325 from CPU 320. The GPIO line is a type of wire signaling communication. GPIO line 325 may connect CPU 320 and ICH 335. GPIO 325 may be physically secure. At system startup or reboot, BIOS 355 may read the GPIO pin 325 and detect the assertion or de-assertion of physical presence. In some embodiments, BIOS 355 may read the GPIO pin 325 directly. In other embodiments, a GPIO pin may be connected as input to a device internal register such as the ICH or SIO (super input/output) GPIO register, and BIOS 355 may read the internal register. BIOS 355 may then send a message to TPM 350 that physical presence has been asserted.

This assertion of GPIO pin 325 in response to a message from management server 305 may proxy a trusted path from a remote console to a physical actuation on the computer 311.

BMC 315 may authenticate the management server 305 and assert the GPIO pin 325 to inform BIOS that physical presence has been asserted during the normal BIOS physical detection phase, such as the Core Root of Trust for Measurement (CRTM) phase of BIOS flow. The use of BMC 315 to indicate physical presence may have the added advantage of moving the complexity of physical presence detection to a coprocessor, such as BMC 315, from the space-starved BIOS boot-block, too.

The communications path illustrated in FIG. 3 is for explanation, not for limitation. In many alternative embodiments, the GPIO line may be replaced by any hardware signaling communication. In some alternative embodiments, a BMC may assert/de-assert physical presence to a TPM without use of a hardware mechanism. One mechanism may utilize an IPMI command, WS-MAN command, or other command from BIOS to BMC pursuant to a remote management protocol. BIOS may issue an IPMI command, WS-MAN command, or other remote management command to query BMC if physical presence has been asserted. To provide security with this mechanism, the IPMI interface to the BMC may be kept locked to prevent an unauthorized entity from using the mechanism. For example, while provisioning a system in the factory, BMC and BIOS may, be placed in manufacturing mode. Factory automation software may take ownership of BIOS and BMC and may install a shared secret used for authentication.

As another mechanism for signaling physical presence without using a GPIO pin, BMC 315 may write a value to the data integrity register (DIR) 340 of the ICH chip 335 indicating whether physical presence has been asserted. TPM 350 may directly read the value. This use of the ICH chip is for illustration and not limitation. In alternative embodiments, a platform system management module such as a BMC or service processor may write a value to other chips to indicate whether physical presence has been asserted. In other alternative embodiments, a message to assert/de-assert physical presence may pass from a management server to a BMC or service processor without passing through a CMM.

In many alternative embodiments, the communications path may omit a platform system management module such as a BMC, In some embodiments, for example, a full network stack on the in-band core CPU firmware, such as BIOS or the Intel® Platform Innovation Framework for Extensible Firmware Interface (EFI) (sometimes referred to by the codename Tiano), may make the security association with the management console. BIOS or EFI may receive a message over a network from a CMM or management server or other device requesting the signaling of physical presence and may signal to a TPM that physical presence has been asserted. The trusted paths illustrated in FIG. 3 may be used for messages other than the indication of physical presence and may have as their ultimate destination a module other than a TPM.

Figure 4:
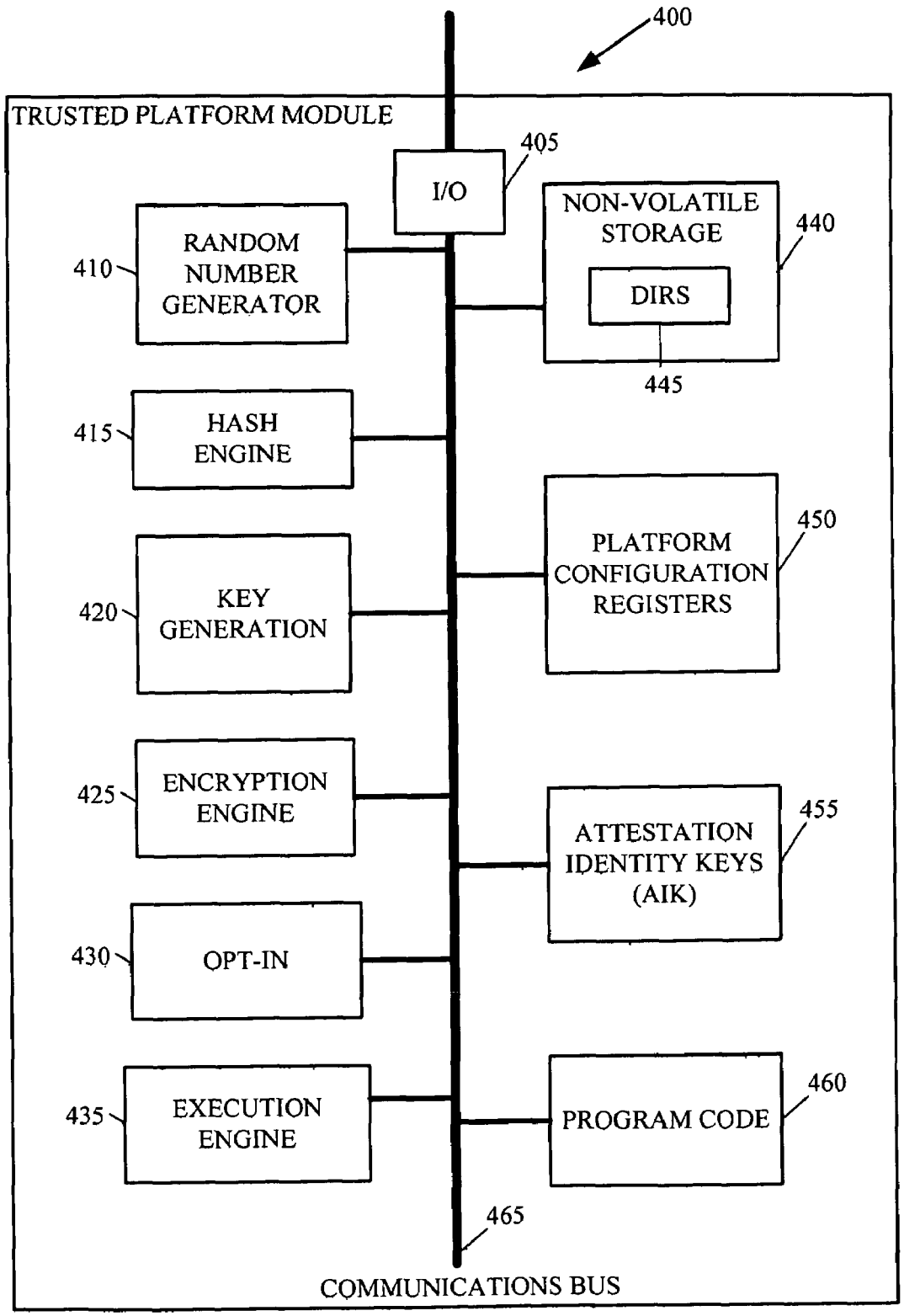
FIG. 4 depicts an embodiment of a TPM.

FIG. 4 depicts an embodiment of a TPM 400 that includes a I/O module 405, a random number generator 410, a hash engine 415, a key generation module 420, an encryption engine 425, an opt-in module 430, an execution engine 435, non-volatile storage 440, platform configuration registers (PCRs) 450, attestation: identity keys (AIK) module 455, and program code 460 connected by communications bus 465. I/O module 405 may control communications between the modules of the TPM 400 and may communicate with external buses. I/O module 405 may encrypt and decrypt data transmitted between TPM 400 and external modules.

Random number generator 410 may produce random numbers for use in key generation and password generation. Hash engine 415 calculates message digests, fixed-length strings produced from input strings. The message digests may be used for digital signatures or for verifying the integrity of messages. Key generation 420 may generate cryptographic keys. The keys may include signing keys, storage keys, and attestation identity keys used by attestation identity key module 455. Encryption engine 425 may encrypt and decrypt data and may sign messages. Encryption engine 425 may use keys produced by key generation 420. Opt-in module 430 may enable a user to opt-in or opt-out of use of the TPM 400. Execution engine 435 may run code contained in program code module 460, and may perform initialization and may determine the state of configurations of the computing platform containing the TPM 400 ("measurement").

Non-volatile storage module 440 may include Data Integrity Registers (DIR) 445. DIRs 445 may be used to store states of configurations under which access to data is permitted. Platform configuration registers (PCRs) 450 are registers that may store measurements of configurations of the computing platform containing TPM 400. AIK module 455 may utilize AIKs to attest to or vouch for the accuracy of data protected by TPM 400, such as the state of configurations of the computing platform containing the TPM 400. Attestation of data by TPM 400 may include the signing of the data with an AIK. Program code 460 may contain code for measuring the state of configurations. The program code 460 may be contained in firmware.

TPM 400 may operate in a variety of states—no-TPM ownership state, disabled state, and regular state. A TPM may ship from manufacturing under the no-TPM owner state. In addition, an owner who has misplaced the TPM authorization may wish to change the state to no-ownership in order to create a new authorization. Physical presence may be required in order to change the states of TPM 400. Physical presence is an indication that a human owner of a platform is next to the platform. The mechanism may involve a jumper that can be set, a button to push, a key from a keyboard to depress, or a biometric device. TPM 400 may receive a signal of physical presence which was transmitted in response to receiving a message over a secure network connection. The message may have directed the signaling of physical presence to TPM 400.

The components of a TPM illustrated in FIG. 4 are for explanation, not for limitation. Other embodiments of a TPM may contain additional components, or may omit some of the components of FIG. 4. In other embodiments of a TPM, some of the components shown in FIG. 4 may be divided into multiple components or may be combined into a single component. In many other embodiments of a TPM, the modules may be implemented in hardware, firmware, or in state machines.

Figure 5:
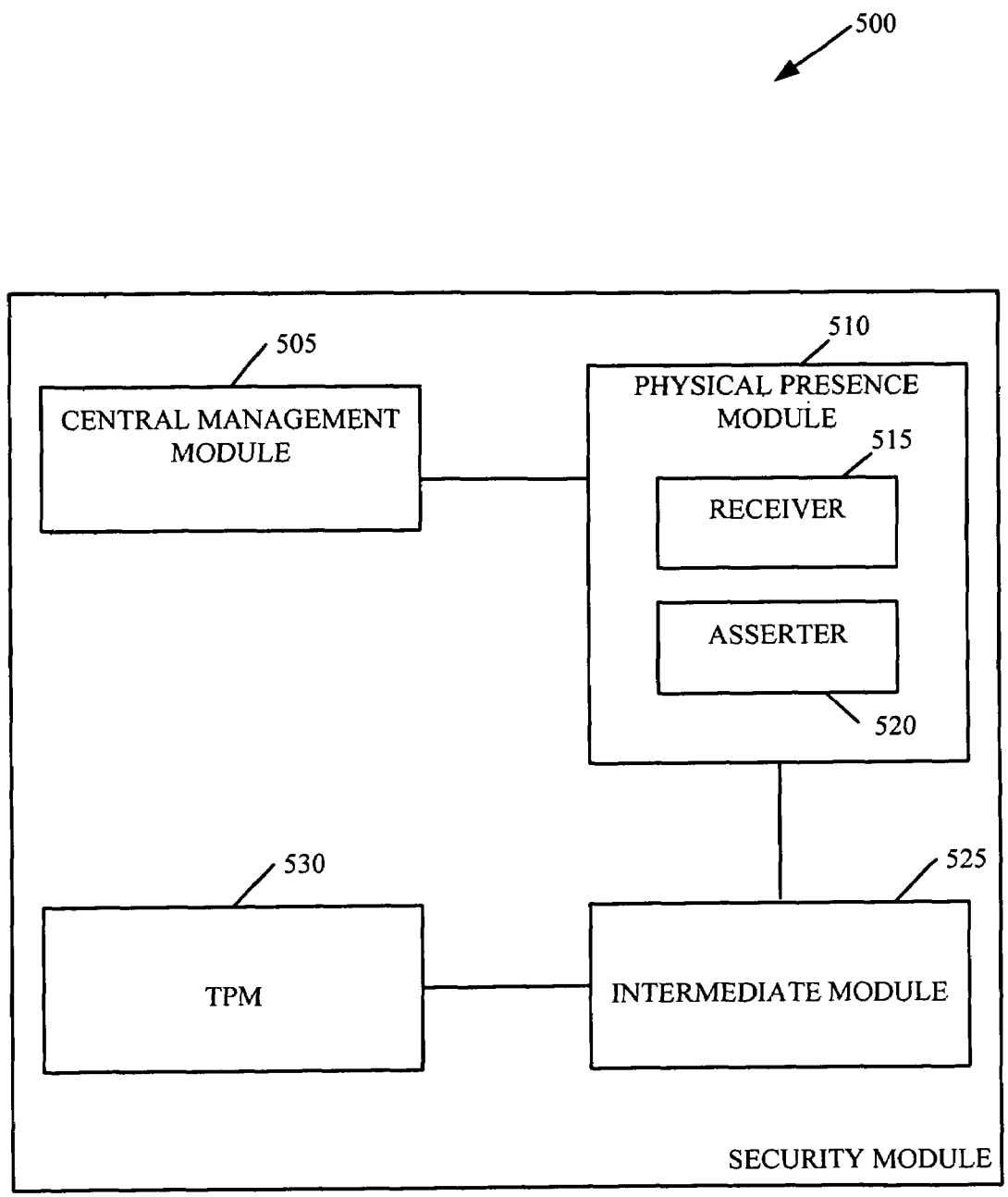
FIG. 5 depicts an embodiment of an apparatus to remotely indicate physical presence to a TPM.

FIG. 5 depicts an embodiment of an apparatus to remotely indicate physical presence to a TPM. Security module 500 includes central management module 505, physical presence module 510, intermediate module 525, and TPM 530. Central management module 505 may send a message directing a signaling of physical presence to a TPM over a secure network connection. Central management module 505 may consist of a platform running enterprise management software or a remote console for the remote management of a server. The secure network connection may provide for privacy, authentication, integrity, or authorization of the message.

Physical presence module 510 includes receiver 515 and asserter 520. Receiver 515 may receive a message or other signal to assert/de-assert physical presence to a TPM over a secure network connection. Receiver 515 may receive the message or signal directly from the central management module 505, or may receive a message directing a signaling of physical presence from another module in response to the other module receiving the message from the central management module 505. For example, physical presence module 510 may consist of a BMC in a blade server. The blade server may be located on a blade server rack whose chassis contains a chassis management module. The chassis management module may receive the message to assert/de-assert physical presence from the central management module 505. In response, the chassis management module may send a message to the physical presence module 510, and the message may be received by receiver 515. As another example, the receiver 515 may consist of a full network stack in BIOS.

Asserter 520 may signal physical presence to a TPM in response to the receiver 515 receiving a message to signal physical presence. A BMC may, for example, assert/de-assert a GPIO pin to signal physical presence, may indicate physical presence in response to an IPMI or WS-MAN query from BIOS, or may write a value to a DIR of an ICH or other chip which indicates physical presence.

Intermediate module 525 may receive a signal from asserter 520 and may indicate to TPM 530 that physical presence has been asserted/de-asserted. For example, intermediate module 525 may consist of BIOS. BIOS may read a GPIO pin, a value in a DIR of an ICH or other chip, or receive a response from an IPMI or WS-MAN query. In response, BIOS may indicate to TPM 530 that physical presence has been asserted/de-asserted. TPM 530 may then undergo a state change.

FIG. 5 is for illustration and not limitation. Other embodiments may omit some of the modules of FIG. 5, or may comprise different modules or the same modules with different configurations. For example, in some alternative embodiments, an intermediate module may be omitted. The physical presence module may consist of BIOS with a full network stack. BIOS may receive a message from a management module and may directly signal a TPM that physical presence has been asserted/de-asserted. In many alternative modules, there may be modules intermediate between a management module and a physical presence module. For example, a chassis management module contained in a blade server rack may receive a message from the remote management module and may in turn send a message to a BMC on a blade server to signal physical presence to a TPM on the blade server.

Figure 6:
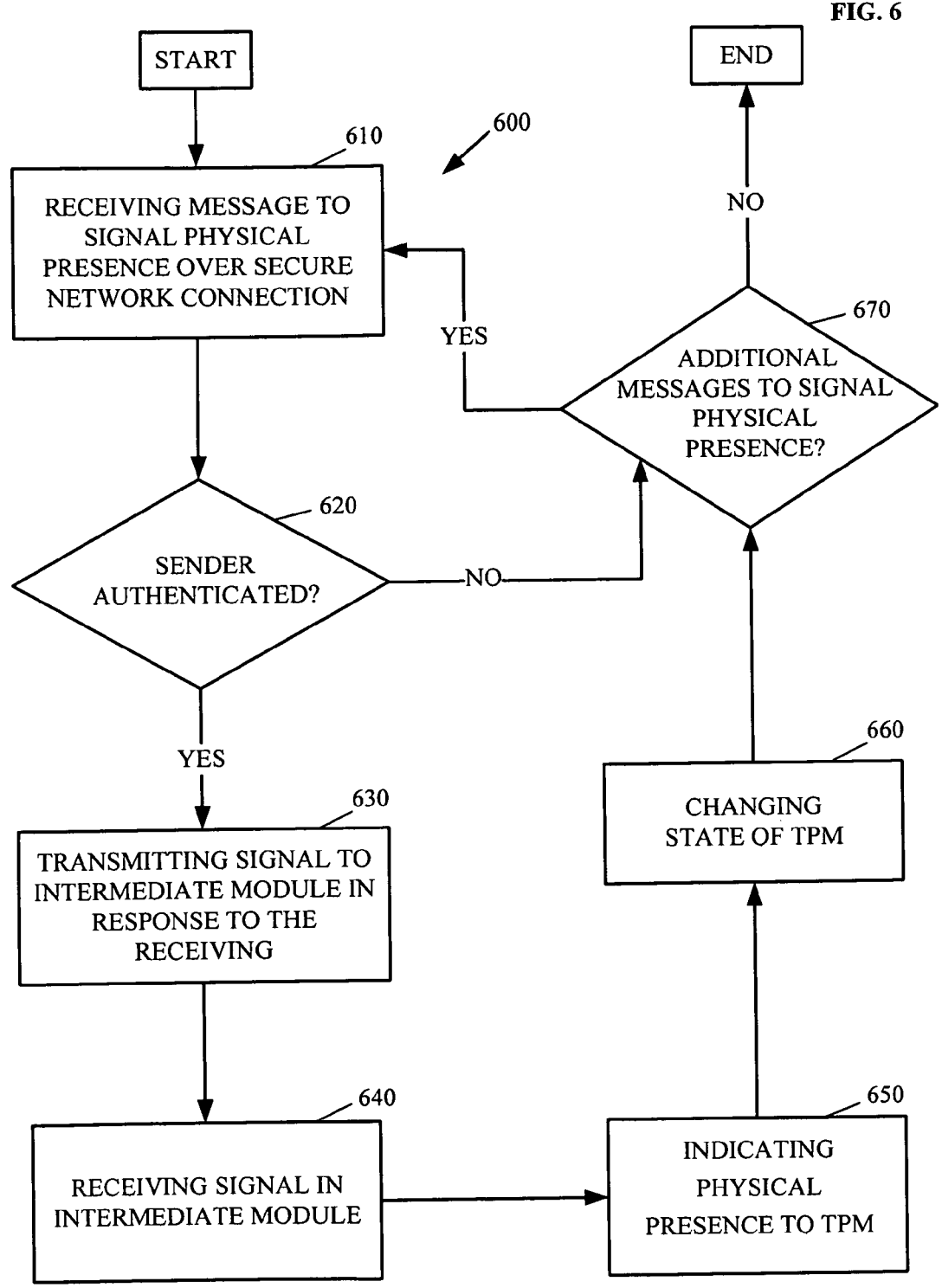
FIG. 6 depicts a flowchart of an embodiment to remotely indicate physical presence to a TPM.

Turning now to FIG. 6, there is shown a flowchart of an embodiment to remotely indicate physical presence to a TPM. Flowchart 600 of FIG. 6 includes receiving a message to signal physical presence over a secure network connection (element 610). The recipient of the message may attempt to authenticate the sender (element 620). The message may be sent under a security protocol that provides authentication as well as encryption, such as TLS, IPSec, or SSH, or the authentication may be performed under a separate protocol such as Kerberos or a pre-shared key. If the sender is not authenticated, the method of flowchart 600 may include checking for additional messages requesting the signaling of physical presence (element 670). If the sender is authenticated, the recipient of the message may transmit a signal to an intermediate module in response to receiving the message (element 630). For example, a BMC may signal to BIOS to indicate physical presence to a TPM.

The intermediate module may receive the signal (element 640). For example, BIOS may read a GPIO pin or a value in a DIR register in an ICH or other chip, or may receive a response to an IPMI query. The intermediate module may indicate physical presence to a TPM (element 650). For example, on start-up or rebooting, BIOS may inform a TPM that physical presence has been indicated.

Upon being informed of physical presence, the TPM may comply with a request to change its state (element 660). For example, the TPM may change from a normal state to a disabled state or from a state with owner to an ownerless state. If there are additional messages to signal physical presence (element 670), each element of flowchart 600 from element 610 to element 660 may be repeated. Otherwise, the remote indication of physical presence to a TPM may end.

The elements of FIG. 6 are for illustration and not limitation. In other embodiments, the elements may be performed in a different order, the elements may be combined with additional elements, or some of the elements may be omitted. In some alternate embodiments, an intermediate module may be omitted. For example, BIOS with a full network stack may receive a message to indicate physical presence and may indicate physical presence to a TPM without transmitting a signal to an intermediate module.

Various embodiments of the disclosed subject matter may be implemented in hardware, firmware, software, or combination thereof, and may be described by reference to or in conjunction with program code, such as instructions, functions, procedures, data structures, logic, application programs, design representations or formats for simulation, emulation, and fabrication of a design, which when accessed by a machine results in the machine performing tasks, defining abstract data types or low-level hardware contexts, or producing a result.

For simulations, program code may represent hardware using a hardware description language or another functional description language which essentially provides a model of how designed hardware is expected to perform. Program code may be assembly or machine language, or data that may be compiled and/or interpreted. Furthermore, it is common in the art to speak of software, in one form or another as taking an action or causing a result. Such expressions are merely a shorthand way of stating execution of program code by a processing system which causes a processor to perform an action or produce a result.

Program code may be stored in, for example, volatile and/or non-volatile memory, such as storage devices and/or an associated machine readable or machine accessible medium including solid-state memory, hard-drives, floppy-disks, optical storage, tapes, flash memory, memory sticks, digital video disks, digital versatile discs (DVDs), etc., as well as more exotic mediums such as machine-accessible biological state preserving storage. A machine readable medium may include any mechanism for storing, transmitting, or receiving information in a form readable by a machine, and the medium may include a tangible medium through which electrical, optical, acoustical or other form of propagated signals or carrier wave encoding the program code may pass, such as antennas, optical fibers, communications interfaces, etc., including wireless access mechanisms. Program code may be transmitted in the form of packets, serial data, parallel data, propagated signals, etc., and may be used in a compressed or encrypted format.

Program code may be implemented in programs executing on programmable machines such as mobile or stationary computers, personal digital assistants, set top boxes, cellular telephones and pagers, and other electronic devices, each including a processor, volatile and/or non-volatile memory readable by the processor, at least one input device and/or one or more output devices. Program code may be applied to the data entered using the input device to perform the described embodiments and to generate output information. The output information may be applied to one or more output devices. One of ordinary skill in the art may appreciate that embodiments of the disclosed subject matter can be practiced with various computer system configurations, including multiprocessor or multiple-core processor systems, minicomputers, mainframe computers, as well as pervasive or miniature computers or processors that may be embedded into virtually any device. Embodiments of the disclosed subject matter can also be practiced in distributed computing environments where tasks may be performed by remote processing devices that are linked through a communications network.

Although operations may be described as a sequential process, some of the operations may in fact be performed in parallel, concurrently, and/or in a distributed environment, and with program code stored locally and/or remotely for access by single or multi-processor machines. In addition, in some embodiments the order of operations may be rearranged without departing from the spirit of the disclosed subject matter. Program code may be used by or in conjunction with embedded controllers.

It will be apparent to those skilled in the art having the benefit of this disclosure that the present invention contemplates methods and arrangements to communicate with a TPM over a network. It is understood that the form of the invention shown and described in the detailed description and the drawings are to be taken merely as examples. It is intended that the following claims be interpreted broadly to embrace all the variations of the example embodiments disclosed.

Although the present invention and some of its advantages have been described in detail for some embodiments, it should be understood that various changes, substitutions and alterations can be made herein without departing from the spirit and scope of the invention as defined by the appended claims. Although an embodiment of the invention may achieve multiple objectives, not every embodiment falling within the scope of the attached claims will achieve every objective. Moreover, the scope of the present application is not intended to be limited to the particular embodiments of the process, machine, manufacture, composition of matter, means, methods and steps described in the specification. As one of ordinary skill in the art will readily appreciate from the disclosure of the present invention, processes, machines, manufacture, compositions of matter, means, methods, or steps, presently existing or later to be developed that perform substantially the same function or achieve substantially the same result as the corresponding embodiments described herein may be utilized according to the present invention. Accordingly, the appended claims are intended to include within their scope such processes, machines, manufacture, compositions of matter, means, methods, or steps.

What is claimed is:

1. A method to provide computer security, the method comprising:

receiving a message over a secure network connection, the message directing the signaling of physical presence to a trusted platform module (TPM), the TPM contained in a computing device; and signaling physical presence to the TPM in response to the receiving, wherein signaling physical presence to the TPM comprises signaling that a human owner of the computing device is next to the computing device and able to interact physically with the computing device.

2. The method of claim 1, further comprising sending a message over the secure network connection, the message directing the signaling of physical presence to the TPM.

3. The method of claim 1, further comprising determining by the TPM that physical presence is signaled, in response to receiving the signal of physical presence.

4. The method of claim 1, wherein the receiving comprises receiving by a platform system management module.

5. The method of claim 1, wherein the receiving comprises receiving by a network stack of a basic input/output system (BIOS).

6. The method of claim 1, wherein the signaling comprises sending a signal by means of a physically secure hardware signaling mechanism.

7. The method of claim 6, wherein the sending comprises sending a signal over a physically secure general purpose input/output (GPIO) line.

8. The method of claim 1, wherein the signaling comprises sending a message pursuant to a protocol for the remote management of computers.

9. The method of claim 1, wherein the signaling comprises writing a value to a data integrity register (DIR).

10. An apparatus to provide computer security, the apparatus comprising:
    one or more processors;
    a trusted platform module (TPM) contained in a computing device;
    a physical presence module to receive a message over a secure network connection, the message directing a signaling of physical presence to the TPM; and
    an assertion module to signal physical presence to the TPM, responsive to the physical presence module, wherein:
        signaling physical presence to the TPM comprises signaling that a human owner of the computing device is next to the computing device and able to interact physically with the computing device.

11. The apparatus of claim 10, further comprising the TPM to determine whether physical presence is signaled, responsive to the assertion module.

12. The apparatus of claim 10, further comprising a central management module to send a message, the message directing a signaling of physical presence.

13. The apparatus of claim 10, wherein the physical presence module comprises a service processor.

14. The apparatus of claim 13, wherein the service processor comprises a baseboard management controller (BMC).

15. The apparatus of claim 10, wherein the physical presence module comprises a network stack of a basic input/output system (BIOS).

16. The apparatus of claim 10, wherein the assertion module comprises logic to send a signal over a physically secure hardware signaling mechanism.

17. The apparatus of claim 16, wherein the physically secure hardware signaling mechanism comprises a general purpose input/output (GPIO) line.

18. The apparatus of claim 10, wherein the assertion module comprises logic to send a message to indicate physical presence pursuant to a protocol for the remote management of computers.

19. The apparatus of claim 10, wherein the assertion module comprises logic to write a value to a data integrity register (DIR) to indicate physical presence.

20. A system to provide computer security, the system comprising a blade server rack, the blade server rack comprising:
    a blade server comprising:
        a trusted platform module (TPM);
        a physical presence module to receive messages from a chassis management module; and
        an assertion module to signal physical presence to the TPM, responsive to the physical presence module, wherein signaling physical presence to the TPM comprises signaling that a human owner of the blade server is next to the blade and able to interact physically with the blade server; and
    a chassis comprising:
        the chassis management module to receive messages from a remote management module, the messages directing a signaling of physical presence to the TPM, and to transmit messages to the physical presence module directing a signaling of physical presence to the TPM.

21. The system of claim 20, further comprising the TPM to determine whether physical presence is signaled, responsive to the assertion module.

22. The system of claim 20, further comprising the remote management module to transmit messages over a secure network connection to the chassis management module, the messages directing a signaling of physical presence to the TPM.

23. A machine-readable storage device, the device having one or more associated instructions, wherein the one or more instructions, when executed, cause a machine to:
    receive a message over a secure network connection to signal physical presence to a trusted platform module (TPM), the TMP contained in a computing device; and
    signal physical presence to the TPM in response to the receiving, wherein signaling physical presence to the TPM comprises signaling that a human owner of the computing device is next to the computing device and able to interact physically with the computing device.

24. The device of claim 23, wherein the one or more associated instructions, when executed, further cause the machine to:
    send a message over the secure network connection to signal physical presence to the TPM.

25. The device of claim 23, wherein causing the machine to receive a message comprises causing the machine to receive the message by a platform system management module.

26. The device of claim 23, wherein causing the machine to receive a message comprises causing the machine to receive the message by a network stack of a basic input/output system (BIOS).

27. The device of claim 23, wherein causing the machine to signal comprises causing the machine to send an Intelligent Platform Management Interface (IPMI) message.

28. The device of claim 23, wherein causing the machine to signal comprises causing the machine to write a value to a data integrity register (DIR).

29. The device of claim 1, wherein the signaling comprises signaling physical presence to the TPM in response to the receiving, wherein:
    no human owner is nearby the computing device.

30. The method of claim 1, wherein the receiving comprises receiving a message over a secure wide area network.

* * * * *